(12) United States Patent
Olivier

(10) Patent No.: US 12,704,204 B2
(45) Date of Patent: Aug. 11, 2026

(54) HOLDER FOR A FLUID CONNECTOR FITTING AND FLUID DISPENSER

(71) Applicant: Merck Patent GmbH, Darmstadt (DE)

(72) Inventor: Stephane Olivier, Molsheim (FR)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 18/700,536

(22) PCT Filed: Oct. 10, 2022

(86) PCT No.: PCT/EP2022/078036
§ 371 (c)(1),
(2) Date: Apr. 11, 2024

(87) PCT Pub. No.: WO2023/061905
PCT Pub. Date: Apr. 20, 2023

(65) Prior Publication Data
US 2025/0230882 A1 Jul. 17, 2025

(30) Foreign Application Priority Data
Oct. 13, 2021 (EP) .................................... 21306432

(51) Int. Cl.
*B01L 9/00* (2006.01)
*B01L 3/00* (2006.01)
*F16L 3/12* (2006.01)

(52) U.S. Cl.
CPC ............. *F16L 3/1215* (2013.01); *B01L 3/561* (2013.01); *B01L 9/50* (2013.01); *B01L 2200/141* (2013.01)

(58) Field of Classification Search
CPC .......... F16L 3/1215; B01L 3/561; B01L 9/50; B01L 2200/141; A47B 73/00
See application file for complete search history.

(56) References Cited

U.S. PATENT DOCUMENTS 3,217,891 A * 11/1965 Weaver ..................... B01L 9/54 211/74
3,242,920 A * 3/1966 Andersen ........... A61B 5/02152 600/487
3,690,318 A * 9/1972 Gorsuch ........... A61M 5/16845 222/25
3,863,809 A * 2/1975 Christine .................. B67B 7/28 222/105
4,651,902 A 3/1987 Hobbs et al.
4,712,280 A * 12/1987 Fildan .................... A44B 11/08 24/615
5,127,531 A * 7/1992 Onodera .......... A61B 5/150519 211/74
5,178,303 A * 1/1993 Blenkush ............... B67D 3/043 222/509

(Continued)

FOREIGN PATENT DOCUMENTS

AU 2001270355 B2 3/2005

OTHER PUBLICATIONS

International Search Report PCT/EP2022/078036 dated Jan. 31, 2023 (pp. 1-3) and written opinion (pp. 1-6).

*Primary Examiner* — Nkeisha Smith
(74) *Attorney, Agent, or Firm* — Christopher B. Kilner; MILLEN, WHITE, ZELANO & BRANIGAN, P.C.

(57) ABSTRACT

The present application relates to a holder for a fluid connector fitting and to a fluid dispenser including the same.

19 Claims, 4 Drawing Sheets

(56) References Cited

U.S. PATENT DOCUMENTS

| | | | | | |
|---|---|---|---|---|---|
| 5,405,333 | A * | 4/1995 | Richmond | A61J 1/2096 | 604/257 |
| 5,470,037 | A * | 11/1995 | Willis | A61J 9/0638 | 248/409 |
| 5,737,810 | A * | 4/1998 | Krauss | A44B 11/266 | 24/625 |
| 6,296,796 | B1 * | 10/2001 | Gordon | B29C 39/021 | 425/129.1 |
| 7,316,428 | B2 * | 1/2008 | Takayanagi | F16L 3/1226 | 285/87 |
| 8,596,688 | B2 * | 12/2013 | Pisula, Jr. | A61M 39/10 | 285/308 |
| 9,605,785 | B2 | 3/2017 | Murray et al. | | |
| 12,131,826 | B2 * | 10/2024 | Kamen | A61M 5/1415 | |
| 2002/0085952 | A1 * | 7/2002 | Ellingboe | A61M 1/3663 | 604/4.01 |
| 2002/0179783 | A1 | 12/2002 | Kim | | |
| 2005/0082828 | A1 * | 4/2005 | Wicks | F16L 37/38 | 285/320 |
| 2006/0129109 | A1 * | 6/2006 | Shaw | A61M 39/26 | 604/246 |
| 2007/0156091 | A1 * | 7/2007 | Fathallah | A61M 5/1418 | 604/151 |
| 2008/0011907 | A1 | 1/2008 | Jacobsma | | |
| 2008/0078464 | A1 * | 4/2008 | Loewe | F16L 37/0847 | 138/109 |
| 2010/0082828 | A1 | 4/2010 | Jennings et al. | | |
| 2022/0260189 | A1 * | 8/2022 | Deuse | C12M 37/04 | |
| 2025/0114280 | A1 * | 4/2025 | Fabrigas | A61J 15/0015 | |

* cited by examiner

HOLDER FOR A FLUID CONNECTOR FITTING AND FLUID DISPENSER

TECHNICAL FIELD

The present application relates to a holder for a fluid connector fitting and to a fluid dispenser including the same.

BACKGROUND

In laboratory environments the situation frequently occurs that fluids must be dispensed into a vessel or reservoir through a disposable flexible dispensing tubing. This requires a reliable fixation of a spout or outlet opening of the tubing in a stable position to precisely direct the flow into the vessel and to avoid a displacement of the position of the spout or outlet opening due to vibrations or shocks, i.e. from a pump or other equipment, in the surrounding as this could create spillage or droplets. For this purpose, the tubing is normally temporarily fixed in a stand using several clamps or pinching screws. Such a fixation is, however, not necessarily stable as far as the discharge position or discharge direction from the spout or outlet opening is concerned if the tubing is fixed at positions that are more or less remote from the spout or are not sufficiently fixing the tubing. Moreover, the fixation is often complex, involves plural steps, is not intuitive and frequently not safe.

In some applications, when contamination is critical, the dispensing tubing must be provided sterilized and closed with a cap which is easy to be removed without the risk of touching the port and spout/outlet opening and any parts of the receiving vessel. In such applications the contact between the operator's hands/gloves and the dispenser needs to be limited in general. This is critical in the prior art in particular where the port of the dispensing tubing must be closed without removing the setup and fixation of the tubing because the fixation is normally not rigid or stable enough to provide the necessary counterforce to the closing action.

There are situations wherein a dispensing tubing must be extended while or after the fixation setup of the dispensing tubing is already in place. In the prior art this requires a dismounting of the tubing fixation and a replacement against a different, longer tubing.

Finally, there are situations wherein access to a receiving vessel is necessary while the tubing fixation is to be maintained in place for subsequent processing steps. In the prior art this can be difficult in view of the frequently unstable arrangement of tubing, stand and clamps.

In the prior art there are known a number of releasable connection assemblies for joining tubing sections. US 2005/0082828 A1, for example, discloses a connection assembly for creating a releasable fluid seal connection between two or more sections of tubing which includes a male fluid connector fitting and a female fluid connector fitting. The male fluid connector fitting has at least one, preferably a pair of elastic latches, clasps prongs or claws (the term "elastic latch" is synonymously used for all these terms in this specification to describe a protrusion configured to cooperate with a mating recess or catch structure in a releasable form-locking engagement due to its flexibility that restores an initial posture or shape after a temporary deformation) with corresponding catch structures on the female fluid connector fitting. Interactions between the female and male fluid connector fittings can be linear or rotatable with respect to the male and/or female fluid connector fittings.

The male fluid connector fitting typically has a port in the form of a male cylindrical shaft with a spout or outlet opening at the proximal end, and the female fluid connector fitting has a port in the form of a female cylindrical receptacle or shaft with a lumen dimensioned to receive, in an insertion direction, and fluid-tightly seal against the male shaft. The male fluid connector fitting also has a pair of elastic latches extending spaced apart from the male shaft and parallel to the axis of the male shaft. The distal ends of the latches are respectively formed with a latch tab protruding in a direction normal to the outer surface of the male shaft adjacent the respective latch. The female fluid connector fitting has a pair of mating catches or recesses formed on opposite sides of the outer surface of the female shaft. The connection assembly is held together by the insertion of the latch tabs of the latches into the slots or the catches in the axial direction after forcing the latches towards each other against their elasticity, and the form-locking interface between the latch tabs and the catches upon return of the latches to their original position.

The latch tabs of the latches are biased in a direction outward from outer surface of the male shaft by their elasticity when forced towards each other. Insertion of the latch tabs into the catches in the axial direction will more or less automatically force the latches inward until the form locking engagement is completed. An assisting inward force is normally supplied by the user squeezing the latches towards each other when inserting the male shaft into the female shaft. Releasing the engagement normally requires that the latches are manually forced inward toward the male shaft by the user in order for the latch tabs to disengage from the catches and fit through the slots in the catches during a pulling of the male shaft out from the female shaft in the axial direction when the male and female fluid connector fittings are pulled apart and separated.

Such type of connector fitting is used herein and is throughout this application generally referred to as "side latch fluid connector fitting" or simply as "connector fitting". For the holder and the fluid dispenser as defined in the present application, use is made of different types of such connectors, without being bound to a specific design. In an extreme example it is feasible for the present holder and fluid dispenser to work with a side latch connector fitting having only one side latch, or with a connector fitting having three or more latches.

While a male connector fitting is preferably used and used throughout the following description, a female connector fitting may be used instead by inverting the mechanical components and engagement principle. The disclosure is thus not meant to be limited to a male or female type of connector fitting.

It is therefore an object of the present application to provide a holder for a fluid connector fitting and a fluid dispenser including the same which are improved to solve at least some of the disadvantages in the prior art and provide a simple-to-use, stable, versatile and secure solution for dispensing fluids in a laboratory environment.

SUMMARY

The present application thus provides a holder for a fluid connector fitting with the features of claim 1 and a fluid dispenser including the same with the features of claim 13. Preferred embodiments are defined in the respective dependent claims.

The present application in particular provides a holder for a fluid connector fitting, which fluid connector fitting comprises a fluid port, a spout, and at least one elastic latch, preferably a pair of elastic latches, configured to form a side releasable connection, designed to provide a releasable fluid-tight connection with a mating fluid connector fitting, the holder comprising a holder body including a retainer formed such that the connector fitting can be inserted and fixedly held in the retainer by means of a releasable engagement of the at least one elastic latch with a portion of the retainer so that the spout of the fluid port is freely accessible and is oriented in a defined orientation to allow dispensing of fluid from the spout.

Preferably, the retainer is formed such that the releasable engagement of the at least one elastic latch with the retainer is made by a linear movement of the fluid connector fitting relative to retainer and/or by a rotational movement of the fluid connector fitting relative to retainer.

Preferably, the releasable engagement is a snap-in form-locking engagement of the at least one elastic latch, preferably by a linear movement along a longitudinal direction of the fluid connector fitting until a holding protrusion of the at least one elastic latch engages with a mating locking feature on the retainer upon an elastic deformation of the at least one elastic latch.

Preferably, the releasable engagement is a bayonet-type form-locking engagement of the at least one elastic latch, preferably by a combination of a linear movement along a longitudinal direction of the fluid connector fitting and a subsequent rotation of the fluid connector fitting about the longitudinal direction to bring a holding protrusion of the at least one elastic latch in engagement with a mating locking feature on the retainer.

Preferably, the holder body is configured such that a position of the retainer in a longitudinal direction along the holder body is adjustable, preferably in that the retainer is formed on a slider slidable along a guide rail on the holder body or in that the holder body includes a portion configured to expand/contract or unfold in the longitudinal direction.

Preferably, the retainer is mounted to the holder body such that the inclination of the retainer relative to the holder body can be changed to change the orientation of the spout of the fluid port of the fluid connector fitting when held in the retainer.

Preferably, the holder body has at least one hinge mechanism for changing an angular orientation about a/the longitudinal direction of the holder body and/or about a vertical orientation.

Preferably, the holder body further comprises a fluid shield arranged so as to occupy a part of the surrounding of the spout of the fluid port of the fluid connector fitting when held in the retainer.

Preferably, the holder further comprises a guide and/or a fixation for a tubing section connected to the fluid connector fitting.

Preferably, the holder further comprises a cap configured to be releasably engaged with the fluid port of the fluid connector fitting in a first orientation to fluid-tightly seal the spout when the fluid connector fitting is held in the retainer.

Preferably, the cap is formed such that, when engaged with the fluid port of the fluid connector fitting held in the retainer in the first orientation, disengagement of the at least one elastic latch from the retainer is prevented, preferably in that a portion of the cap mechanically limits the elastic deformation of the at least one elastic latch in the release direction.

Preferably, the cap is configured to be releasably engaged with the at least one elastic latch in a second orientation to retain the cap on the fluid connector fitting while engaged with the fluid port.

The present application also provides a fluid dispenser comprising a holder as defined herein, and a fluid connector fitting which is configured to be held in the retainer of the holder and which comprises a fluid port, a spout, and at least one elastic latch, preferably a pair of elastic latches, configured to form a side releasable connection, designed to provide a releasable fluid-tight connection with a mating fluid connector fitting, the port of the fluid connector fitting configured to communicate with a flexible tubing, and, preferably, a stand integrated with or connected with or adapted to be connected with the holder body of the holder so as to be able to maintain the fluid connector fitting held in the retainer of the holder in a defined height position above a working surface, and preferably so as to allow an adjustment of the height position thereof.

Preferably, the stand is connected with or adapted to be connected with the holder body of the holder so that the holder is able to be rotated or translated to get access to a reservoir placed beneath the spout.

Preferably, the stand further comprises a guide and/or a fixation for the tubing connected to the fluid connector fitting.

BRIEF DESCRIPTION OF THE DRAWINGS

The present holder and fluid dispenser as described herein will now be described in the form of a preferred embodiment by reference to the attached exemplary schematic drawing, in which.

Figure 1:
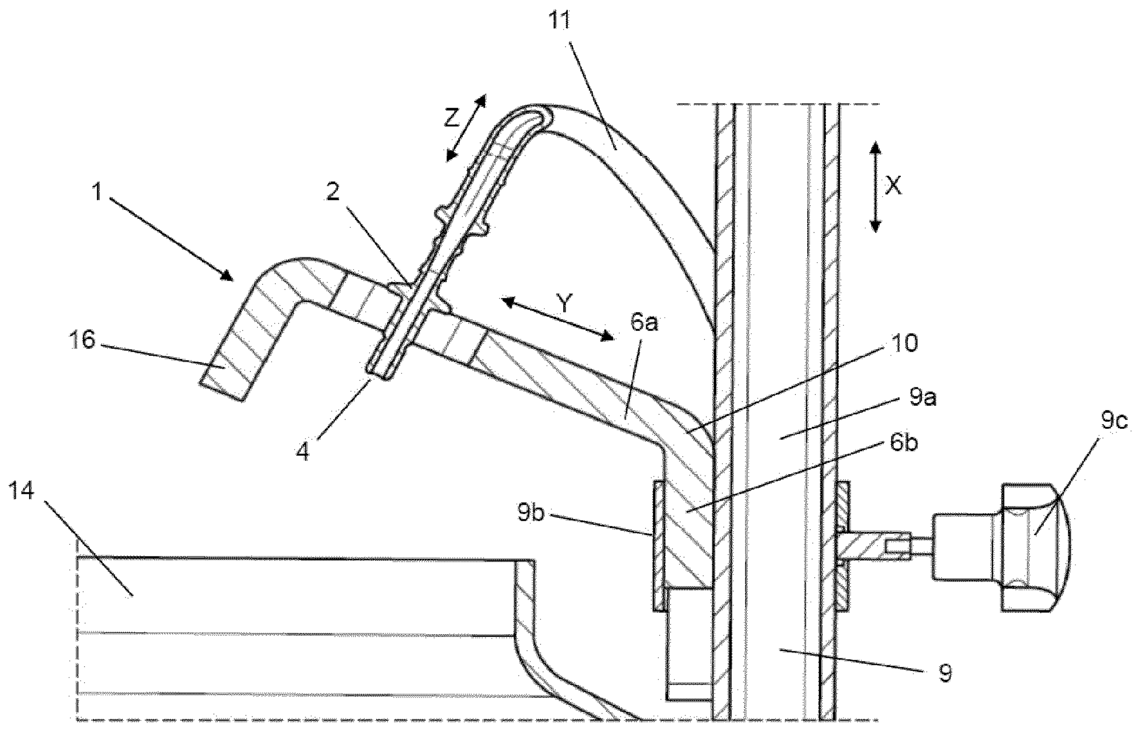
FIG. 1 is a partially cut-away side view of the present fluid dispenser with a holder as described herein.
Figure 6:
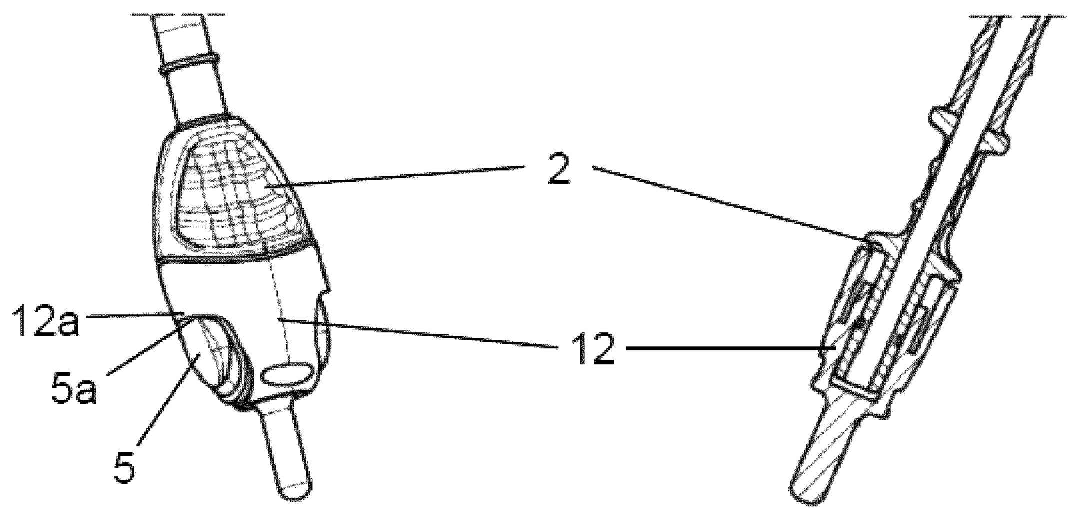
Figure 7:
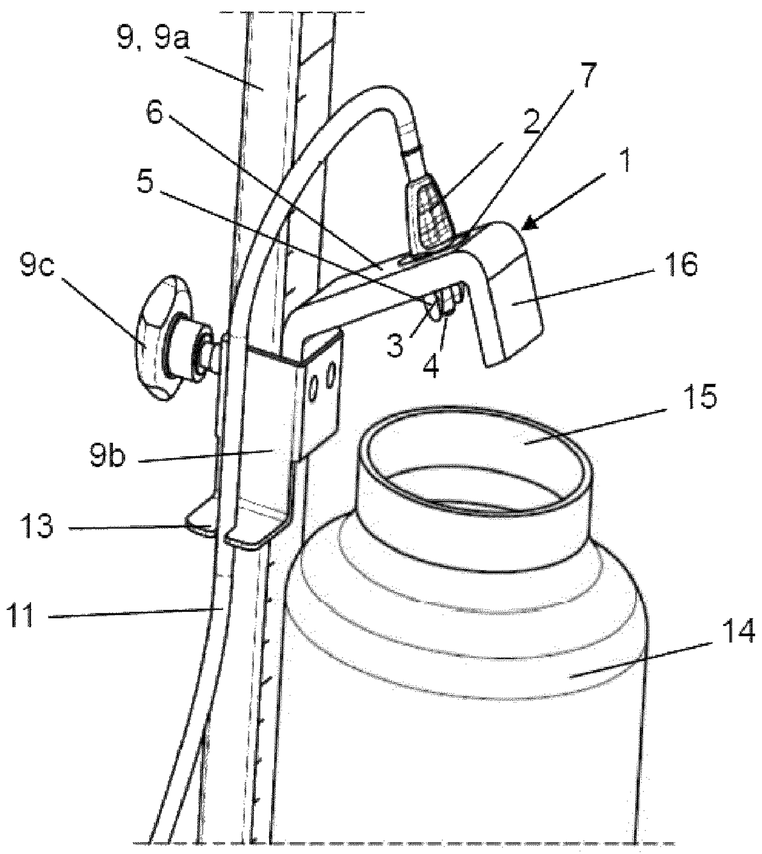

FIG. **5*a* is a perspective view of a modification of the holder of FIG. 1** showing the connecting process;

FIG. **5*b* is a perspective cut-away view of the modification of the holder of FIG. 1** in the inserted position;

FIG. 6 is a perspective view of a connector with a cap to be used with the present holder; and FIG. 7 is a perspective view of a fluid dispenser as described herein with a holder as described herein.

DETAILED DESCRIPTION

An exemplary embodiment of a fluid dispenser as defined herein, in particular one that is suitable for use in laboratory environments to dispense fluids into a vessel or container, is shown in FIGS. 1 and 7 and typically comprises a holder 1 for a side latch fluid connector fitting as defined herein (wherein it is to be understood that the holder can be used in a universal way independently from the other components of the fluid dispenser), a first fluid connector fitting 2 which comprises—as described in the introductory portion of the specification—a fluid port 3, a spout or outlet opening 4 at a distal end of the port 3, and at least one elastic latch 5, preferably a pair of elastic latches 5, configured to form a side releasable connection, designed to provide a releasable fluid-tight connection with a mating fluid connector fitting. The first fluid connector fitting is in the exemplary embodiment a male fluid connector fitting and it is connected to a length of a flexible tubing 11 or optionally by a length of a flexible tubing 11 to a second fluid connector fitting (not shown) which has a fluid port and is designed to provide a releasable fluid-tight connection with a mating fluid connector fitting. The flexible tubing may thus fluidly connect the ports of the first and second fluid connector fittings.

The second fluid connector fitting—if present—may be of the same type of side latch connector fitting as the first connector fitting, it may be the female mating version of it (which is preferred to provide a simple extension of length of the tubing with compatible connectors), or may even be a connector fitting of a different type or concept to be compatible with upstream equipment. The second fluid connector is optional and can be replaced by a direct connection (for example, a welded or glued connection) with a bag or other container, a syringe or any other desired device. The second end of the tubing may also simply remain open.

The present fluid dispenser may further comprise a stand 9 integrated with or connected with or adapted to be connected with a holder body 6 of the holder 1 so as to be able to maintain the first fluid connector fitting 2 held in a retainer 7 of the holder 1 in a defined height position X above a working surface, and preferably so as to allow an adjustment of the height position X thereof. In the exemplary embodiment the holder 1 is attached to a vertical post 9*a* of the stand 9 by means of a bracket 9*b* that can be slid along the post 9*a* and fixed at different height positions by means of a clamping screw 9*c* in that a proximal end of the holder body 6 is clamped between the bracket 9*b* and the post 9*a*. Other adjustable attachments of the holder body 6 to the post and other forms of the holder 9 are possible, provided the stand is sufficiently stable and rigid to support the holder 1 with the connector fitting in a defined position and to preferably allow the attachment of a cap and the dismounting of the connector described later.

It is preferred that the stand 9 has a base to be placed and, if necessary fixed, to the working surface so as to be self-supporting. The stand 9 can, however, be designed to be attached to other equipment or furniture in the laboratory environment.

The fixation of the first fluid connector fitting 2 in the retainer 7 of the holder body 6 that will be described in further detail below ascertains that the spout 4 of the fluid port 3 is freely accessible and is oriented in a defined orientation downward to allow dispensing of fluid from the spout 4 into an opening 15 of a vessel or reservoir 14 as shown in FIGS. 1 and 7. The vessel or reservoir can be a bottle or bag or even a well plate or other type of reservoir used in the laboratory context.

Although not shown in the drawing the stand 9 may be connected with or adapted to be connected with the holder body 6 of the holder 1 by means of a bracket that is designed so that the holder 1 is able to be rotated or translated to a lateral side or upward while remaining attached in a defined height position to provide easy selective access to the opening 15 of the reservoir 14 placed beneath the spout 4.

Further, the stand 9 may further comprise at least one guide and/or a fixation 13 for the tubing 11 connected to the fluid connector fittings 2. In the exemplary embodiment the fixation 13 is integrated with the bracket 9*b* in the form of a simple recess or slot that is slightly smaller than the diameter of the tubing to provide a fixation once the tubing is inserted into the recess/slot. Plural such fixations or guides of different type and mechanical principle can be provided along the length of the stand.

The holder 1 for the present fluid connector fitting 2 (side latch connector fitting) as shown in the figures comprises a holder body 6 including a retainer 7 formed such that the connector fitting 2 can be inserted and fixedly held in the retainer 7 by means of a releasable engagement of the elastic latch or latches 5 with a portion 8 of the retainer 7 so that the spout 4 of the fluid port 3 is freely accessible and is oriented downward in a defined orientation to allow dispensing of fluid from the spout 4.

Figure 5A:
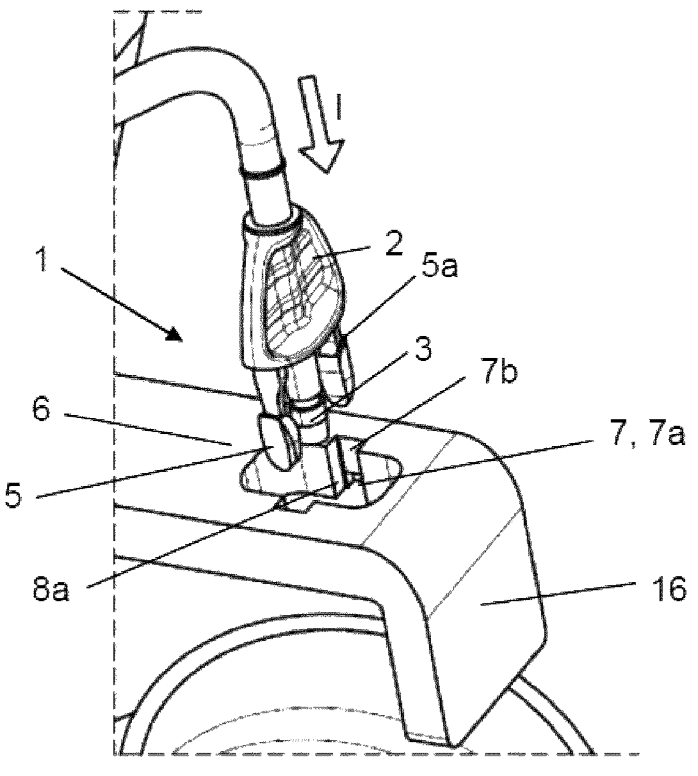

In the variant of the holder shown in FIG. 5*a* the retainer 7 is formed such that the releasable engagement of the latch/latches 5 with the retainer 7 is made only by a linear movement of the fluid connector fitting 2 relative to retainer 7 in an insertion direction I. The retainer in this variant has a main opening 7*a* dimensioned to receive at least the port 3, preferably also a part of the outline of a casing of the connector fitting 2, and lateral slots or grooves 7*b* extending in the insertion direction I for receiving the latches 5. The grooves 7*b* are dimensioned to automatically force the latches against their elasticity inwards, i.e. towards the port 3, during insertion. An assisting inward force can be supplied by the user squeezing the latches toward each other when inserting the connector fitting into the retainer.

Figure 5B:
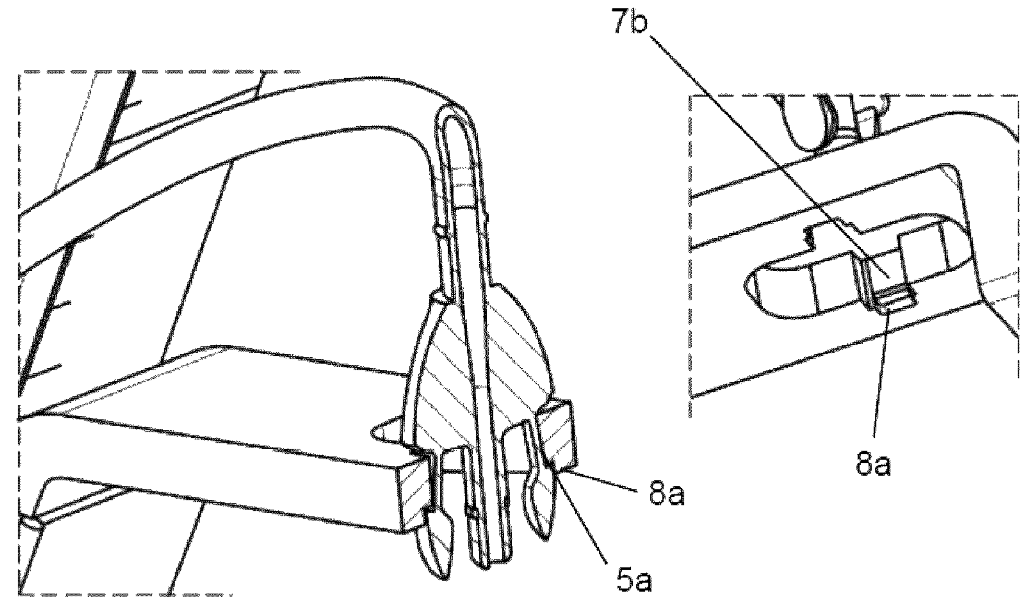

As is more clearly visible in FIG. 5*b*, a catch 8*a* is formed at a lower end of each groove 7*b* or within the groove along its length to provide for a form-locking engagement of the latch tabs 5*a* of the latches with the catches 8*a* in the fully inserted position due to the biasing outward force of the deformed latches. The dimensions of the main opening, grooves and catches provides for a tight and secure fixation of the connector fitting in a defined orientation in the fully inserted position. To remove the connector fitting, the latches 5 are manually pushed towards each other while the connector fitting is pulled in the linear direction opposite to the insertion direction I, or the connector fitting is simply pulled with a certain force in that direction that overcomes the form-locking engagement of the latch tabs 5*a* with the catches 8*a*. To adjust the force necessary to overcome the engagement, the engaging sections can be rounded to a certain extent. Further, the holder body and retainer may be designed to allow sufficient access of fingers to a part of the latches to allow pinching them towards each other to assist the disengagement from the catches.

The releasable engagement is thus a snap-in form-locking engagement of the elastic latches 5 by a linear movement along a longitudinal direction Z of the fluid connector fitting 2 until a holding protrusion or latch tab 5*a* of the latches 5 engages with a mating locking feature or catch 8*a* on the retainer 7 upon an elastic deformation of the latches 5.

Figure 2:
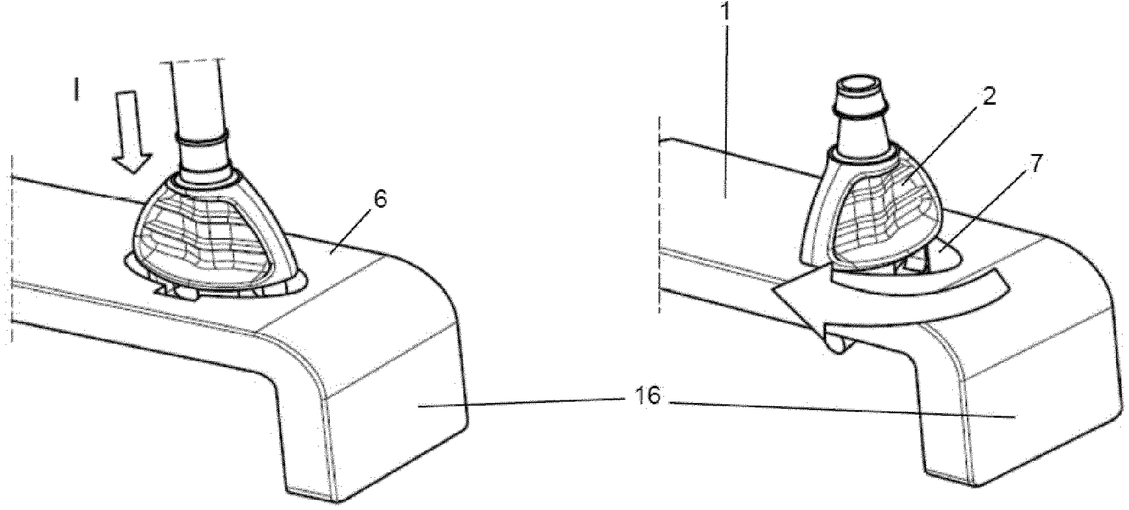
FIG. 2 is a perspective view of the holder of FIG. 1 showing the connecting process with a retainer of the holder.
Figure 3:
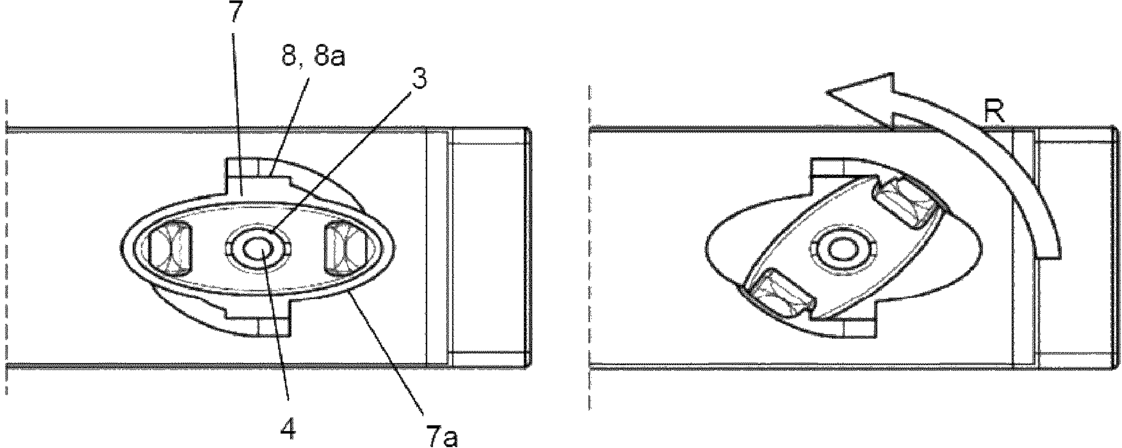
FIG. 3 is a bottom view of the holder of FIG. 2 during the connection process.

In the variant of FIGS. 2 and 3 the fixation or locking of the latch/latches 5 is made by a rotational movement of the fluid connector fitting 2 relative to retainer 7 in a rotational direction R preceded by a linear movement in an insertion direction I so that the attachment is similar to a bayonet-type mechanical connection. In this case the main opening 7*a* is formed to at least allow insertion of the port and of the latch/latches of the connector fitting and allow its rotation in the inserted state as shown in FIGS. 2 and 3. The grooves may be formed so as to extend in a circumferential direction or may be replaced by a circumferential protrusion guiding the latch tabs 5*a* into their final engagement with the catches 8*a*. In this case dedicated catches may even be dispensed with if the grooves or protrusions provide a sufficient fixation in a defined rotation position. To remove the connector fitting the connector fitting is rotated in the opposite rotational direction until the latch tabs 5*a* become free from the circumferential protrusions or grooves, then the connector fitting is linearly pulled out from the main opening. This variant may be preferred as it requires less force for removing the connector fitting from the holder.

The releasable engagement is thus a bayonet-type form-locking engagement of the elastic latch/latches 5 by a combination of a linear movement along a longitudinal direction Z of the fluid connector fitting 2 and a subsequent rotation of the fluid connector fitting 2 about the longitudinal direction Z to bring a holding protrusion of latch tabs 5*a* of the latches 5 in engagement with a mating locking feature or catch 8*a* on the retainer 7 upon an elastic deformation of the latches 5.

Figure 4:
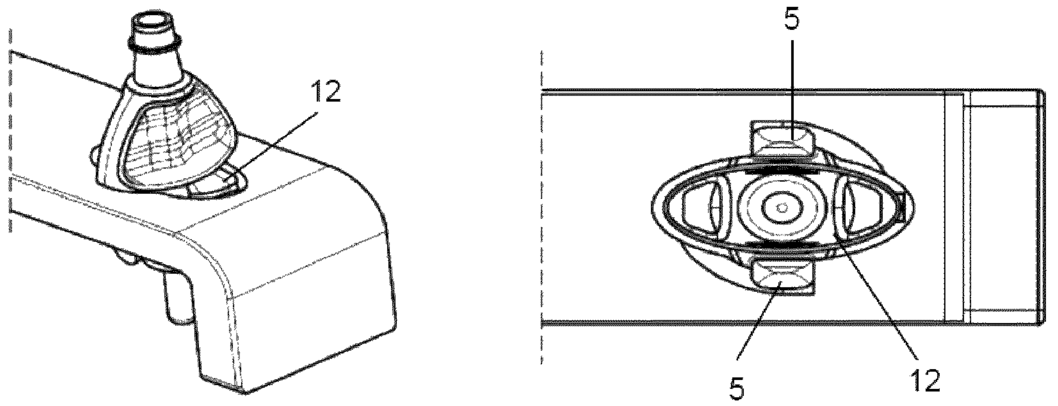
FIG. 4 is a perspective view of the holder of FIG. 1 with a cap closing the port and preventing removal of the connector from the retainer of the holder.

As shown in FIG. 4 the present holder 1 may further comprise a fluid connector cap 12 that is configured to be releasably engaged with the fluid port 3 of the fluid connector fitting 2 in a first orientation to fluid-tightly seal the spout 4 when the fluid connector fitting 2 is held in the retainer 7. The cap 12 may be connected with the port 3 from underneath the holder body 6 through the main opening or an enlarged window in the holder body. The cap 12 is formed such that, when engaged with the fluid port 3 of the fluid connector fitting 2 held in the retainer 7 in the first orientation, disengagement of the latches 5 from the grooves or protrusions of the retainer 5 either by linear movement or by rotation is prevented in that a portion of the cap 12 mechanically limits the elastic deformation of the latches 5 in the release direction that is necessary for the latch tabs 5*a* to disengage from the catches 8*a*. Thus, the connector is prevented from inadvertent removal from the retainer 7 as long as the cap 12 is in place in this first position.

In this first position the cap 12 is not necessarily used to be tight to internal over pressure in the tubing 11 of the connector but mainly to prevent the spout from external contamination and to avoid undesired droplets falling from the spout when the system is not in use. In this configuration the side latches 5 are not used to retain the cap 12 which thus can be easily placed or removed by a user.

On the other hand, the cap 12 is configured to be releasably engaged with the latches 5 in a second orientation or position (turned by 90 degrees from the orientation in the first position) when the fluid connector fitting is removed from the retainer 7 to securely retain the cap 12 on the fluid connector fitting 2 while engaged with the fluid port 3 in that the latch tabs 5*a* enter into a form-locking engagement with catches 12*a* on the cap 12 (see FIG. 6). In this second position the cap 12 seals the port 3 even in case of higher pressures in the tubing and/or during extended handling.

In the exemplary embodiment the holder body 6 is integrally formed with the retainer 7. However, the retainer and the holder body may be formed as separate elements that are mounted together. This modification provides certain advantages and possibilities.

For example, the holder body 6 may be configured such that a position of the retainer 7 in a longitudinal direction Y along the holder body 6 is adjustable, for example in that the retainer 7 is formed on a slider slidable along a guide rail on the holder body 6 or in that the holder body 6 includes a portion configured to expand/contract or unfold in the longitudinal direction Y, for example by providing one or more hinge mechanism(s) between portions of the holder body of which one that is movable contains the retainer. Thus, by moving the portion of the holder body with the retainer an angular orientation of the retainer about the longitudinal direction Y of the holder body 6 and/or about a vertical orientation can be changed.

In another modification the retainer 7 formed as a separate element may be mounted to the holder body 6 such that the inclination of the retainer 7 relative to the holder body 6 can be changed to change the orientation of the fluid connector fitting 2 when held in the retainer 7 and thus the position and orientation of the spout 4 of the fluid port 3.

In the exemplary embodiment shown in the FIGS. 1, 2 and 5 for example the holder body 6 comprises a fluid shield 16 arranged so as to occupy a part of the surrounding of the spout 4 of the fluid port 3 of the fluid connector fitting 2 when held in the retainer 7. In the exemplary embodiment the shield 16 is integrally formed with the holder body 6 in that a section of the distal end of the holder body 6 is bent downward. The shield may have a different shape or width and may be formed of a separate element attached to the holder body. Such a fluid shield may be completely or at least partly transparent. The shield can help preventing accidental spillage or contamination of a user when handling or operating the dispensing device. By providing the shield to the distal end of the holder body it is always at the appropriate place and position where fluid is dispensed from the spout in use.

In the exemplary embodiment the holder body 6 of the holder 1 is formed in the form of a solid strip of material. It may be formed of plastics or metal or other materials depending on the requirements of use time, stiffness and/or cleaning. It may also be composed of several elements as partly described above. As shown for example in FIG. 1 the proximal end portion 6*b* may be formed to serve as an attachment portion to be mechanically connected with a suitable stand. In the exemplary embodiment the main portion 6*a* of the holder body 6 adjacent the proximal end portion is inclined upward relative to the end portion when in the intended mounted position. The transition from the proximal end portion 6*b* to the main portion 6*a* may include a hinge section 10, for example a kind of a "living hinge", to allow setting of the inclination.

In another modification that is not shown in the figures the holder 1 may further comprise a guide and/or a fixation for a tubing section 11 connected to the fluid connector fitting 2 for the purpose of keeping the tubing section fixed in place and away from the fluid and avoiding entangling of a user's hands with the tubing during use. For the guide or fixation similar structures as described above for the stand can be used.

The holder and the section of tubing with one or two fluid connector fitting(s) at its axial end(s) can be provided in a packaging in a sterilized condition. The one fluid connector fitting may be preassembled in the retainer of the holder body.

The invention claimed is:

1. A device having a fluid connector fitting (2) and holder (1) for the fluid connector fitting (2), the fluid connector fitting (2) comprising:

a fluid port (3), a spout (4), and at least one elastic latch (5) configured to form a side releasable connection, designed to provide a releasable fluid-tight connection with a mating fluid connector fitting, and the holder (1) comprising:

a holder body (6) including a retainer (7) formed such that the connector fitting (2) can be inserted and fixedly held in the retainer (7) by means of a releasable engagement of the at least one elastic latch (5) with a portion (8) of the retainer (7) so that the spout (4) of the fluid port (3) is freely accessible and is oriented in a defined orientation to allow dispensing of fluid from the spout (4).

2. The device according to claim 1, wherein the retainer (7) is formed such that the releasable engagement of the at least one elastic latch (5) with the retainer (7) is made by a linear movement of the fluid connector fitting (2) relative to retainer (7) and/or by a rotational movement of the fluid connector fitting (2) relative to retainer (7).

3. The device according to claim 2, wherein the releasable engagement is a snap-in form-locking engagement of the at least one elastic latch (5), preferably by a linear movement along a longitudinal direction (Z) of the fluid connector fitting (2) until a holding protrusion (5*a*) of the at least one elastic latch (5) engages with a mating locking feature (8*a*) on the retainer (7) upon an elastic deformation of the at least one elastic latch (5).

4. The device according to claim 2, wherein the releasable engagement is a bayonet locking engagement of the at least one elastic latch (5).

5. The device according to claim 4, wherein the bayonet locking engagement of the at least one elastic latch (5) is by a combination of a linear movement along a longitudinal direction (Z) of the fluid connector fitting (2) and a subsequent rotation of the fluid connector fitting (2) about the longitudinal direction (Z) to bring a holding protrusion (5*a*) of the at least one elastic latch (5) in engagement with a mating locking feature (8*a*) on the retainer (7).

6. The device according to claim 1, wherein the holder body (6) is configured such that a position of the retainer (7) in a longitudinal direction (Y) along the holder body (6) is adjustable, preferably in that the retainer (7) is formed on a slider slidable along a guide rail on the holder body (6) or in that the holder body (6) includes a portion configured to expand/contract or unfold in the longitudinal direction (Y).

7. The device according to claim 1, wherein the retainer (7) is mounted to the holder body (6) such that an inclination of the retainer (7) relative to the holder body (6) can be changed to change the orientation of the spout (4) of the fluid port (3) of the fluid connector fitting (2).

8. The device according to claim 1, wherein the holder body (6) has at least one hinge mechanism for changing an angular orientation about a longitudinal direction (Y) of the holder body (6) and/or about a vertical orientation.

9. The device according to claim 1, wherein the holder body (6) further comprises a fluid shield (16) arranged so as to occupy a part of a surrounding of the spout (4) of the fluid port (3) of the fluid connector fitting (2).

10. The device according to claim 1, wherein the holder (1) further comprises a guide and/or a fixation for a tubing section (11) connected to the fluid connector fitting (2).

11. The device according to claim 1, further comprising a cap (12) configured to be releasably engaged with the fluid port (3) of the fluid connector fitting (2) in a first orientation to fluid-tightly seal the spout (4).

12. The device according to claim 11, wherein the cap (12) is formed such that, when engaged with the fluid port (3) of the fluid connector fitting (2) in the first orientation, disengagement of the at least one elastic latch (5) from the retainer (7) is prevented.

13. The device according to claim 12, wherein a portion of the cap (12) mechanically limits an elastic deformation of the at least one elastic latch (5) in a release direction.

14. The device according to claim 11, wherein the cap (12) is configured to be releasably engaged with the at least one elastic latch (5) in a second orientation to retain the cap (12) on the fluid connector fitting (2) while engaged with the fluid port (3).

15. A fluid dispenser comprising the device according to claim 1, wherein the port (3) of the fluid connector fitting (2) is configured to communicate with one end of a flexible tubing (11).

16. The fluid dispenser according to claim 15, further comprising a stand (9) integrated with or connected with or adapted to be connected with the holder body (6) of the holder (1) so as to be able to maintain the fluid connector fitting (2) held in the retainer (7) of the holder (1) in a defined height position (X) above a working surface, and preferably so as to allow an adjustment of the height position (X) thereof.

17. The fluid dispenser according to claim 16, wherein the stand (9) is connected with or adapted to be connected with the holder body (6) of the holder (1) so that the holder (1) is able to be rotated or translated to get access to a reservoir placed beneath the spout (4).

18. The fluid dispenser according to claim 16, wherein the stand (9) further comprises a guide and/or a fixation (13) for a tubing (11) connected to the fluid connector fitting (2).

19. The device of claim 1, wherein the at least one elastic latch (5) includes a pair of elastic latches (5).

* * * * *